2,928,840

3-(o-SUBSTITUTED PHENYL) OXAZOLIDINE-DIONES AND PROCESS THEREFOR

Seymour L. Shapiro, Hastings on Hudson, and Louis Freedman, Bronxville, N.Y., assignors to U.S. Vitamin & Pharmaceutical Corporation, New York, N.Y., a corporation of Delaware No Drawing. Application November 26, 1958
Serial No. 776,426

14 Claims. (Cl. 260—307)

This invention is concerned with a novel method for the synthesis of 3-substituted oxazolidine-2,4-diones, and with the preparation of such oxazolidinediones.

The invention is concerned with oxazolidinediones of the following structure

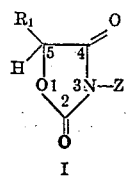

I wherein $R_1$ is hydrogen, a lower alkyl group, or an aryl group, and Z is an ortho-substituted phenyl group wherein the ortho substituent is lower alkyl, lower alkoxy, hydroxy, halogen, which may be further modified by additional substituents on the phenyl ring.

Briefly, the invention comprises the conversion of an α-hydroxy ester, $R_1CH(OH)COOC_2H_5$, by reaction with $ZNH_2$ to the α-hydroxy amide, $R_1CH(OH)CONHZ$, and reaction of said amide with an alkyl, haloalkyl or phenyl chloroformate to yield the carbonate ester of the formula shown (II)

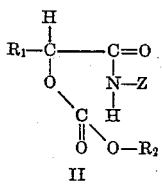

II wherein $R_2$ is selected from the group consisting of lower alkyl, β-chloroethyl, β-chloropropyl and phenyl.

Heating of the carbonate ester II at temperatures between 150 and 300° C. results in a loss of a mole of alcohol, $R_2OH$, which is visible as bubbling in the reaction mixture, and cyclization to the 3-substituted oxazolidinedione which is formed in substantially quantitative yield and may be purified by recrystallization or distillation under diminished pressure. Under these simple reaction conditions good yields of the desired products without breakdown or isomerization are thus obtained.

In the practice of our invention a number of factors have been found to influence the reaction conditions. Thus, as $R_2$ is increased in size, a somewhat higher reaction temperature is required, and as the steric hindrance on —Z is increased, as for example when Z is an ortho-substituted phenyl group, higher reaction temperatures are required. Thus, temperatures may range from 160–300° C. and heating times from 0.1 to 2 hours. However, within the range of these structural variations, the required temperature and period of heating are neither too high nor unnecessarily prolonged.

Moreover, it has been found that catalytic quantities of sodium methoxide speed the reaction and lower the temperature at which reaction occurs.

From the description above it will be apparent that the critical selectivity which determines the scope of the synthesis of oxazolidinediones which may be made by this procedure is dependent on the availability of $ZNH_2$. Since $ZNH_2$ is selected from the group consisting of primary amines which are freely and economically accessible in great diversity of structure, our method permits a broader and more convenient preparation of 3-substituted oxazolidine-2,4-diones than has been previously described.

The oxazolidinediones in which Z is an ortho-substituted phenyl are useful pharmacological agents, particularly, as central nervous system depressants and as such have utility as anti-convulsants and tranquilizing agents.

The α-hydroxy amides which are required as initial reactants are prepared by treatment of the α-hydroxy ester with the amine under reflux, and separating the formed α-hydroxy amide. Typical examples of the scope of this procedure are manifest from inspection of Table I which lists the properties and indicates the scope of compounds prepared as initial reactants.

TABLE I.—α-HYDROXYAMIDES

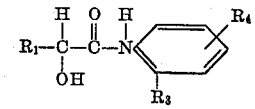

| $R_1$ | $R_3$ | $R_4$ | M.P., °C. | B.P., °C. | mm. Pressure |
|---|---|---|---|---|---|
| H | CH₃— | H | 63–65 | ------ | ------ |
| H | CH₃— | 6-CH₃— | 92–94 | ------ | ------ |
| H | Cl | H | 86–87 | ------ | ------ |
| H | CH₃— | 4-Cl | 88–89 | ------ | ------ |
| H | CH₃O— | H | 107–108 | ------ | ------ |
| H | C₂H₅O— | H | 80–81 | ------ | ------ |
| CH₃— | CH₃— | H | 69–72 | ------ | ------ |
| CH₃— | CH₃— | Cl | 74 | ------ | ------ |
| CH₃— | CH₃— | 4-CH₃— | ------ | 146 | 0.05 |
| CH₃— | CH₃— | 5-CH₃— | ------ | 150 | 0.03 |
| CH₃— | CH₃— | 6-CH₃— | 139–140 | ------ | ------ |
| CH₃— | Cl | H | ------ | 118–134 | 0.02 |
| CH₃— | CH₃O— | H | 71–72 | ------ | ------ |
| CH₃— | C₂H₅O— | H | 64–87 | ------ | ------ |

In a similar manner, by selection of the appropriately commercially accessible ortho-substituted anilines such as o-fluoroaniline, o-bromoaniline, 2-ethylaniline, 2-methyl-6-chloroaniline and the like, the corresponding glycolanilides and lactanilides may be prepared.

As an illustrative embodiment of the manner in which the invention may be practiced, the following examples are presented.

Example 1

ETHYL CARBONATE ESTER OF N-(2-ETHOXYPHENYL) LACTAMIDE

A solution of 4.0 g. (0.02 mole) of N-(2-ethoxyphenyl)lactamide in 15 ml. of pyridine was cooled at 0° C. and 3 ml. of ethyl chloroformate added, dropwise, over 10 minutes with continued stirring and cooling. After standing at 20° C. for 2 hours, the mixture was diluted with 50 ml. of benzene and the unreacted pyridine extracted with dilute hydrochloric acid. The benzene phase was separated, washed with water and the benzene evaporated. The oily residue crystallized on standing, 4.6 g. (81%), and upon recrystallization (ethanol-water) melted at 52.5–53° C.

Example 2

3-(o-ETHOXYPHENYL)-5-METHYL-1,3-OXAZOLIDINE-2,4-DIONE

To 0.01 mole of the carbonate ester of Example 1, there was added 20 mg. of sodium methoxide. This was heated in an oil bath at 160–170° C. for 15 minutes. A vigorous evolution of ethanol is observed and the quantitative residue of product was recrystallized (ethyl acetate-hexane), M.P. 99–100° C.

If sodium methoxide is not added, the pyrolysis to the product requires a bath temperature of approximately 188° C.

The same compound may be prepared by substituting as an initial reactant the methyl carbonate ester of N-(2-ethoxyphenyl)lactamide.

Example 3
ETHYL CARBONATE ESTER OF N-(o-CHLOROPHENYL) LACTAMIDE

The compound was obtained in 91% yield from N-(o-chlorophenyl)lactamide following the procedure of Example 1, and upon recrystallization (hexane) melted at 88.5–89.5° C.

Example 4
3-(o-CHLOROPHENYL)-5-METHYL-1,3-OXAZOLIDINE-2,4-DIONE

Following the procedure of Example 2, and using the ester of Example 3, the product is obtained in quantitative yield, and recrystallized (hexane-ethyl acetate), melted at 85–87° C.

In the absence of sodium methoxide, the pyrolysis to the product requires a bath temperature of 265–270° C.

The same compound may be prepared by substituting as an initial reactant the methyl carbonate ester of N-(o-chlorophenyl)lactamide.

Example 5
ETHYL CARBONATE ESTER OF N-(o-METHOXYPHENYL) LACTAMIDE

The compound was obtained in 87% yield from N-(o-methoxyphenyl)lactamide following the procedure of Example 1, and recrystallized (hexane-ethyl acetate), melted at 65–66° C.

Example 6
3-(o-METHOXYPHENYL)-5-METHYL-1,3-OXAZOLIDINE-2,4-DIONE

Following the procedure of Example 2, and using the ester of Example 5, the product is obtained in quantitative yield, and recrystallized (hexane-ethyl acetate), melted at 84–86° C.

In the absence of sodium methoxide the pyrolysis to the product requires a bath temperature of 240–250° C.

Example 7
ETHYL CARBONATE ESTER OF N-(o-METHYLPHENYL) LACTAMIDE

The compound was obtained in 95% yield from N-(o-methylphenyl)lactamide following the procedure of Example 1, and recrystallized (hexane-ethyl acetate), melted at 116.5–117° C.

Example 8
3-(o-METHYLPHENYL)-5-METHYL-1,3-OXAZOLIDINE-2,4-DIONE

Following the procedure of Example 2, and using the ester of Example 7, the product was obtained in quantitative yield and recrystallized (hexane-ethyl acetate), melted at 103–104° C.

In the absence of sodium methoxide the pyrolysis to the product requires a bath temperature of 240–250° C.

Example 9
ETHYL CARBONATE ESTER OF N-(2,4-DIMETHYLPHENYL) LACTAMIDE

The compound was obtained in 94% yield from N-(2,4-dimethylphenyl)lactamide following the procedure of Example 1, and recrystallized (hexane-ethyl acetate), melted at 119.5–120° C.

Example 10
3-(2,4-DIMETHYLPHENYL)-5-METHYL-1,3-OXAZOLIDINE-2,4-DIONE

Following the procedure of Example 2 and using the ester of Example 9, the product was obtained as a viscous oil which upon distillation under diminished pressure gave a yield of 86%, B.P. 100–110° C. (0.05 mm.).

In the absence of sodium methoxide the pyrolysis to the product requires a bath temperature of 195–200° C.

Example 11

The ethyl carbonate esters of the following glycolanilides were prepared and purified in a manner similar to that described for Example 1:

Ethyl carbonate ester of N-(o-methylphenyl)glycolamide, M.P. 93° C.

Ethyl carbonate ester of N-(2,6-dimethylphenyl)glycolamide, M.P. 129–130° C.

Ethyl carbonate ester of N-(o-chlorophenyl)glycolamide, M.P. 93–94° C.

Ethyl carbonate ester of N-(2-methyl-4-chlorophenyl)glycolamide, M.P. 130–131° C.

Ethyl carbonate ester of N-(o-methoxyphenyl)glycolamide, M.P. 59–60° C.

Ethyl carbonate ester of N-(o-ethoxyphenyl)glycolamide, M.P. 65–67° C.

Example 12

Typical of the cyclization of the compounds of Example 11 to the 3-(o-substituted phenyl)-1,3-oxazolidine-2,4-dione is the preparation of 3-(2,6-dimethylphenyl)-1,3-oxazolidine-2,4-dione.

Using 0.01 mole of the ethyl carbonate ester of N-(2,6-dimethylphenyl)glycolamide, and following the procedure of Example 2, the product is obtained in theoretical yield and recrystallized (hexane-ethyl acetate), M.P. 133–133.5° C.

It is to be understood that it is intended to cover all changes and modifications of the examples of the invention herein chosen for the purpose of illustration which do not constitute departures from the spirit and scope of the invention.

We claim:

1. The process for the preparation of an oxazolidine-2,4-dione of the formula

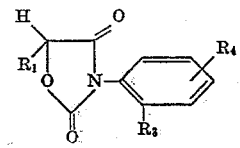

wherein $R_1$ is selected from the group consisting of hydrogen and methyl, $R_3$ is selected from the group consisting of halogen, lower alkyl and lower alkoxy, and $R_4$ is selected from the group consisting of hydrogen, halogen, lower alkyl and lower alkoxy, which comprises fusing a carbonate ester of the formula

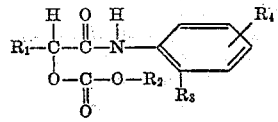

wherein $R_1$, $R_3$ and $R_4$ have the same significance as above, and $R_2$ is lower alkyl, for a period of 0.1–2 hours at 160–300° C. and recovering the aforesaid oxazolidine-2,4-dione.

2. The process of claim 1, comprising the step of adding catalytic quantities of powdered sodium methoxide prior to fusion.

3. The carbonate ester of the formula

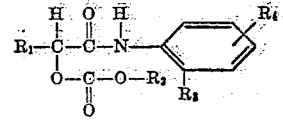

wherein $R_1$ is selected from the group consisting of hydrogen and methyl, $R_2$ is lower alkyl, $R_3$ is selected from the group consisting of halogen, lower alkyl and lower alkoxy, and $R_4$ is selected from the group consisting of hydrogen, halogen, lower alkyl and lower alkoxy.

4. The compound of claim 3 wherein $R_1$ is methyl, $R_2$ is ethyl, $R_3$ is methyl and $R_4$ is hydrogen.

5. The compound of claim 3 wherein $R_1$ is methyl, $R_2$ is ethyl, $R_3$ is chlorine and $R_4$ is hydrogen.

6. The compound of claim 3 wherein $R_1$ is methyl, $R_2$ is ethyl, $R_3$ is methoxy and $R_4$ is p-chloro.

7. The compound of claim 3 wherein $R_1$ is hydrogen, $R_2$ is ethyl, $R_3$ is methoxy and $R_4$ is hydrogen.

8. The compound of claim 3 wherein $R_1$ is hydrogen, $R_2$ is ethyl, $R_3$ is methyl and $R_4$ is 6-methyl.

9. The oxazolidine-2,4-dione of the formula

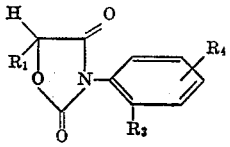

wherein $R_1$ is selected from the group consisting of hydrogen and methyl, $R_3$ is selected from the group consisting of halogen, lower alkyl and lower alkoxy and $R_4$ is selected from the group consisting of hydrogen, halogen, lower alkyl and lower alkoxy.

10. The compound of claim 9 wherein $R_1$ is methyl, $R_3$ is methyl and $R_4$ is hydrogen.

11. The compound of claim 9 wherein $R_1$ is methyl, $R_3$ is methoxy and $R_4$ is hydrogen.

12. The compound of claim 9 wherein $R_1$ is methyl, $R_3$ is chloro and $R_4$ is hydrogen.

13. The compound of claim 9 wherein $R_1$ is methyl, $R_3$ is ethoxy and $R_4$ is hydrogen.

14. The compound of claim 9 wherein $R_1$ is hydrogen, $R_3$ is methyl and $R_4$ is 6-methyl.

References Cited in the file of this patent

FOREIGN PATENTS 159,153    Great Britain _____ Aug. 4, 1921

OTHER REFERENCES

Rekker et al.: Chem. Abstracts, vol. 45, col. 9528 (1951).

Elderfield: Heterocyclic Compounds, vol. 5, pp. 412-3 (1957).

Notice of Adverse Decision in Interference

In Interference No. 92,042 involving Patent No. 2,928,840, S. L. Shapiro and L. Freedman, 3-(o-Substituted phenyl) oxazolidinediones and process therefor, final decision adverse to the patentees was rendered July 2, 1963, as to claim 12.

[*Official Gazette August 27, 1963.*]

Disclaimer 2,928,840.—*Seymour L. Shapiro*, Hastings on Hudson, and *Louis Freedman*, Bronxville, N.Y. 3-(o-SUBSTITUTED PHENYL OXAZOLIDINEDIONES AND PROCESS THEREFOR. Patent dated Mar. 15, 1960. Disclaimer filed June 21, 1963, by the assignee, *U.S. Vitamin & Pharmaceutical Corporation*.

Hereby enters this disclaimer to claim 9 of said patent.

[*Official Gazette September 17, 1963.*]